United States Patent [19]
Allsup, Sr.

[11] 3,750,493
[45] Aug. 7, 1973

[54] VARIABLE SPEED POWER TRANSMISSION

[76] Inventor: John R. Allsup, Sr., 1203 Garfield Ave., Yakima, Wash. 98902

[22] Filed: Oct. 20, 1971

[21] Appl. No.: 190,854

[52] U.S. Cl............... 74/720, 192/58 A, 416/157 A
[51] Int. Cl......................... F16h 47/06, F16d 35/00
[58] Field of Search..................... 192/58 A; 74/720; 416/157 A

[56] References Cited
UNITED STATES PATENTS

| | | | |
|---|---|---|---|
| 1,931,204 | 10/1933 | Rudquist............................ | 192/58 A |
| 2,693,120 | 11/1954 | Maybach .......................... | 74/720 X |
| 2,745,502 | 5/1956 | Gehres............................. | 416/157 A |
| 2,938,397 | 5/1960 | Lemmetty....................... | 192/58 A X |
| 3,054,307 | 9/1962 | Burckhardt....................... | 74/720 X |

FOREIGN PATENTS OR APPLICATIONS

| | | | |
|---|---|---|---|
| 122,144 | 9/1946 | Australia........................ | 416/157 A |
| 126,484 | 1/1948 | Australia......................... | 416/157 A |
| 414,641 | 8/1934 | Great Britain..................... | 192/58 A |

*Primary Examiner*—Charles J. Myhre
*Assistant Examiner*—Thomas C. Perry
*Attorney*—John W. Kraft

[57] ABSTRACT

The present invention comprises: a drum assembly, connected to an input shaft from a suitable torque power source, having a cylindrical chamber carrying fluid, the chamber having fins at intervals on its inner cylindrical wall; a rotor connected to an output shaft, carried in the drum assembly, having a plate perpendicularly disposed to the rotor output shaft, and having a plurality of selectively movable blades disposed at intervals distally from the circumference of the rotor plate; and means for selectively changing the angular relationship of the blades with respect to the rotor plate.

4 Claims, 10 Drawing Figures

JOHN R. ALLSUP, SR. INVENTOR.

PATENTED AUG 7 1973 3,750,493
SHEET 3 OF 6
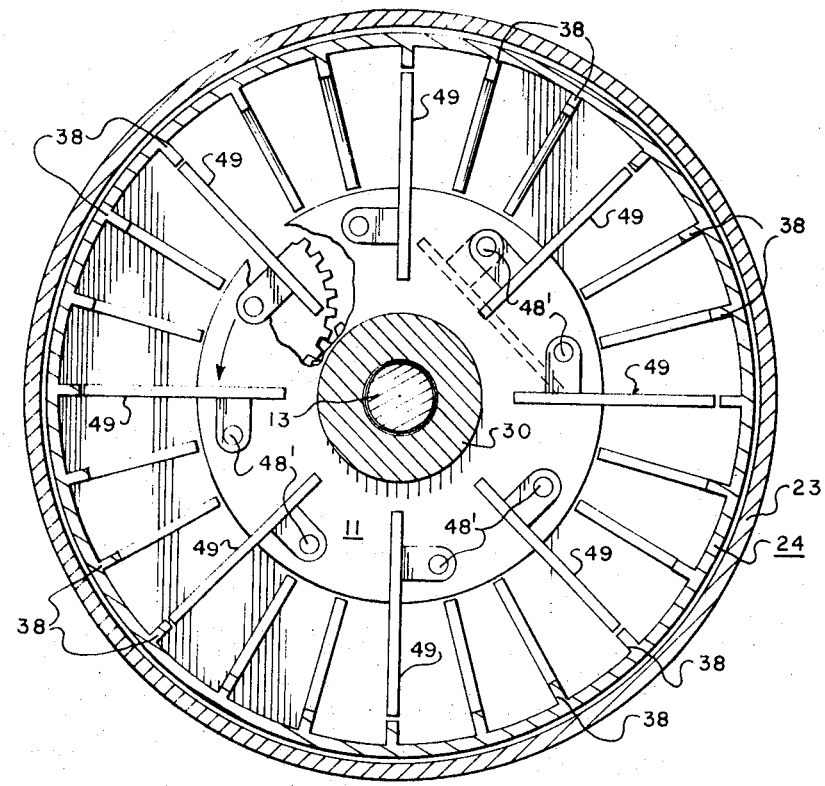
FIG. 4
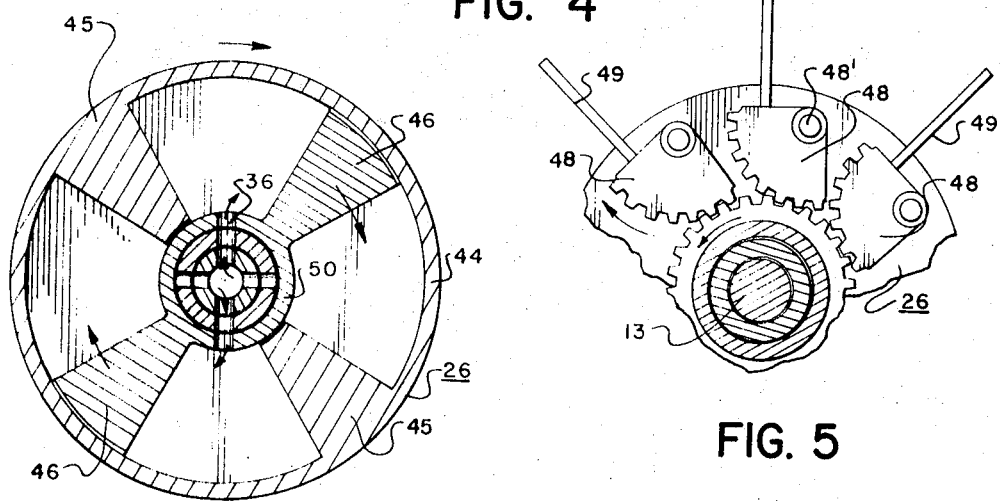
FIG. 6
FIG. 5
JOHN R. ALLSUP SR. INVENTOR.
BY

JOHN R. ALLSUP SR, INVENTOR.

VARIABLE SPEED POWER TRANSMISSION

FIELD OF INVENTION

The present invention relates to power transmissions and more particularly to transmissions operable to provide continuous variations throughout the output range.

DESCRIPTION OF THE PRIOR ART

Power transmissions, commonly used and employed, generally, comprise a variety of combinations of gears and hydraulic mechanisms. Commonly, transmissions provided with gears have, as a characteristic, peak efficiencies which may be described as points on the power outputting range between which there are discontinuous jumps in the power, corresponding to changes to gear ratios. Characteristically, these changes in gear ratio have been provided by means of complex clutch devices. Gear transmissions in combination with hydraulic devices have similar characteristics of discontinuous variations through the power transmission range. Commonly, hydraulic devices have been intended as automatic shifting mechanisms or as power-smoothing mechanisms to cushion the discontinuous output characteristic.

Accordingly, it is an object of the present invention to provide power transmission means which have infinite continuous variations over the output range.

It is an object of this invention to provide power transmission means which do not employ rigid mechanisms.

These and other objects shall become apparent from the description following, it being understood that modifications may be made without affecting the teachings of the invention here set out.

SUMMARY OF THE INVENTION

Generally, the present invention comprises: a drum assembly, connected to an input shaft from a suitable torque power source, having a cylindrical chamber carrying fluid, the chamber having fins at intervals on its inner cylindrical wall; a rotor connected to an output shaft, carried in the drum assembly, having a plate perpendicularly disposed to the rotor output shaft, and having a plurality of selectively movable blades disposed at intervals distally from the circumference of the rotor plate; and means for selectively changing the angular relationship of the blades with respect to the rotor plate.

A more thorough and comprehensive understanding may be had from the detailed description of the preferred embodiment when read in connection with the drawings forming a part of this specification.

BRIEF DESCRIPTION OF THE DRAWINGS:

FIG. 4 is a cross-sectional view of the hydraulic torque converter taken substantially along the lines 4—4 of the FIG. 3.

FIG. 5 is a fragmentary cross-sectional view of the hydraulic torque converter taken substantially along the lines 5—5 of the FIG. 3.

FIG. 6 is a cross-sectional view of the hydraulic torque converter taken substantially along the lines 6—6 of the FIG. 3.

Figure 1:
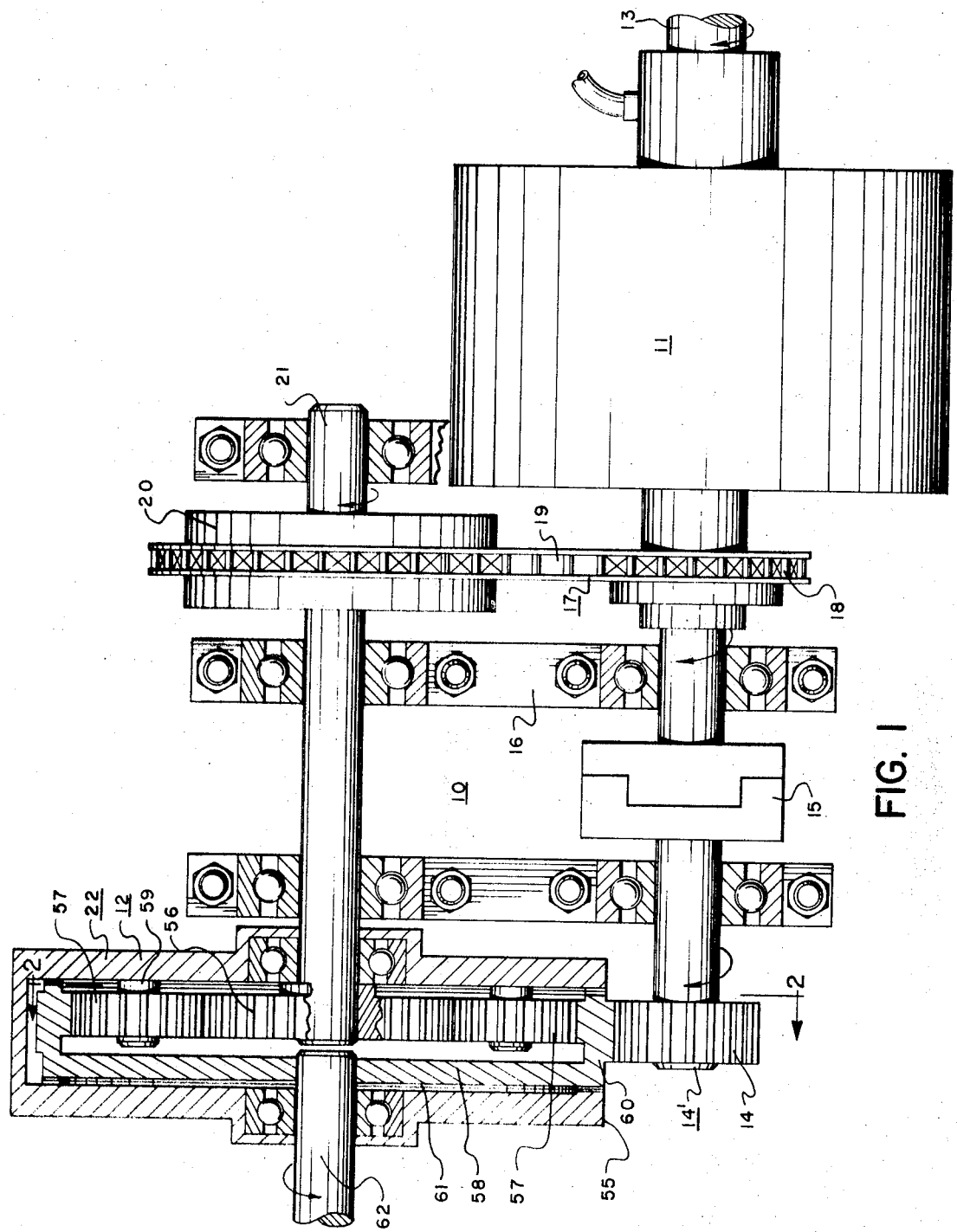
FIG. 1 is a side elevational view of the variable speed transmission of this invention showing the hydraulic torque converter and countergear assembly.

DETAILED DESCRIPTION OF THE PREFERRED EMBODIMENT:

Referring now to the drawings and more particularly to the FIG. 1, the variable speed power transmission of the present invention is shown to advantage and generally identified by the numeral 10. It is to be understood that the transmission 10 may be mounted and carried by any of a variety of commonly known frameworks (not shown). The transmission 10 may be conveniently divided into a hydraulic torque converter 11 and a countergear 12.

Power from a suitable source (not shown) may be applied to a shaft 13 journaled for rotation in the hydraulic torque converter 11. The shaft 13 is provided, at its terminal and opposite the hydraulic assembly 11, with a pinion gear 14 in communication with the countergear assembly 12. In practice it has been found to be convenient to provide a commonly known clutch assembly 15 between the pinion gear 14 and the hydraulic assembly 11. The shaft 13, in communication with the hydraulic assembly 11, is journaled for rotation in a countergear housing 16. The shaft 13 is journaled for rotation in a drive means communicating power 17 from the hydraulic assembly 11 to the countergear assembly 12. The means communicating power 17 may include a sleeved driving sprocket 18, a chain 19, and a commonly known over-riding clutch sprocket assembly 20 suitably fastened to countergear shaft 21 of the gear assembly 12. Hence, it is to be understood that the shaft 13 is journaled for rotation in the sleeved driving sprocket 18. A brake (not shown) may be mounted on the shaft 21 between the overriding clutch sprocket 20 and a gearset 22, giving additional selective control means in operation as hereinafter later described.

Figure 3:
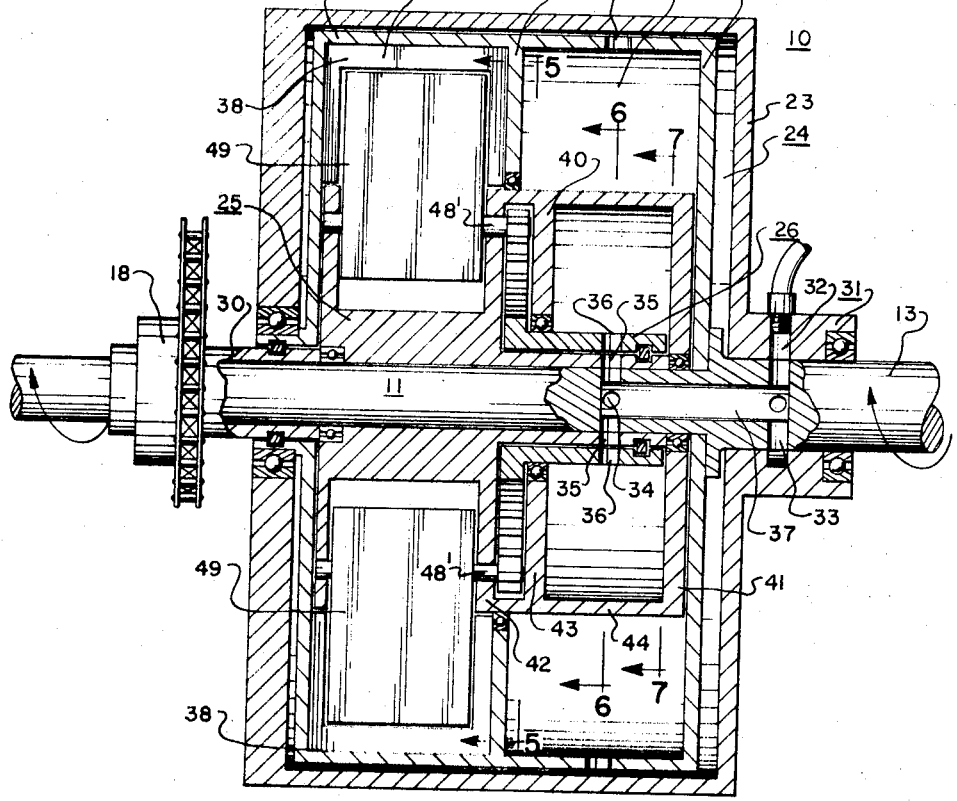
FIG. 3 is a cross-sectional side elevational view of the hydraulic torque converter of this invention drawn to a larger scale.

Referring now to the FIG. 3 showing to advantage the hydraulic torque converter assembly 11 in a side cross-section elevational view, the assembly 11 comprises a cylindrical housing 23, a drum assembly 24, a rotor assembly 25, and a blade control means 26. It is to be understood that the interfaces between the respective assemblies, and between the assemblies and the housing, may be provided with suitable friction reducing means, such as bushings, bearings, and the like, commonly known in the art.

The drum assembly 24 includes a pair of opposing sidewalls 27 and 28 and an upstanding intermediate wall 29 disposed between the respective sidewalls 27 and 28. Hence, the drum assembly 24 is divided into chambers 27' and 28'. The drum assembly 24 is suitably fastened to the shaft 13 by the wall 27, and rotated within the housing 23 in response to rotation of the shaft 13. The rotor assembly 25 is mounted within the drum assembly 24, and includes a hollow shaft portion 30 journaled for the rotation on the shaft 13. The sidewall 28 of the drum assembly 24 is journaled for rotation on the shaft portion 30 of the rotor assembly 25. A collar 31 is provided on the sidewall of the housing 23 opposite the sleeved sprocket assembly 18 carried on the shaft portion 30. The collar 31 includes an entranceway 32 in communication with a suitable source of fluid under pressure. The shaft 13 is provided with a multiplicity of tranverse holes 33 operable to sequentially align with entranceway 32 in response to rotation of the shaft 13. A multiplicity of transverse exit holes 34 are distally disposed on the shaft 13 in alignment with the holes 33, the holes 35 provided on the shaft portion 30 of the rotor assembly 25, and exitways 36 provided in the blade control means 26 hereinafter later described. A rectilinear conduit portion 37 is provided in the shaft 13 between the respective holes 33 and 34. Fluid under pressure may be conducted through the entranceway 32 in the collar 31; through holes 33 in the shaft 13, when aligned with the entranceway 32; through the conduit 37 and the holes 34 on the shaft 13; through the holes 35 on the shaft portion 30; and through exitways 36, when the holes 33, 34 and 35 and the entranceways 32 are in simultaneous alignment.

As set out above the drum assembly 24 is divided by the centrally disposed wall 29 into chambers 27' and 28'. The cylindrical wall of the chamber 28' and the adjacent portions of the walls 28 and 29 are provided with a plurality of inwardly projecting fins 38. It is to be understood that the chamber 28' is usually filled with viscous fluid, such as oil. As the drum assembly 24 rotates, the fins 38 act on the fluid carried in the chamber 28' causing centripetal motion of the fluid. The cylindrical wall of the chamber 27' is provided with a plurality of oil ports 39. The oil ports 39, provided in the cylindrical walls of the chamber 27', provide means communicating the chamber 27' with the interior of the housing 23 through which lubricating coolants may thereby cause circulation to cool the torque converter 11.

The rotor assembly 25 is carried within the drum assembly 24. The rotor assembly 25 comprises a cylindrical shaft 30 and an upstanding enclosure 40. As set out above, the rotor shaft 30 is journaled for rotation over the shaft 13 and in the housing 23. The shaft 30 projects from the housing 23 at the end opposite the collar 31. It is to this projecting shaft portion of the rotor shaft 30 that the sleeved sprocket 18 is fastened. The enclosure 40 is carried within the chamber 27 of the drum assembly 24.

The rotor enclosure 40 includes an upstanding wall 41 disposed on the rotor shaft 30 distally from the sidewall 27 of the drum assembly 24. The rotor enclosure 40 also includes a pair of centrally distally disposed upstanding walls 42 and 43. In relation to the upstanding wall 29 of the drum assembly 24, the rotor wall 42 is disposed distally within the chamber 28'. Thus, the wall 42 appears as a rotating disk within the chamber 28', as more clearly shown in the FIG. 4. A cylindrical wall 44 is fastened about the circumference of the walls 41, 42 and carries the wall 43.

Figure 7:
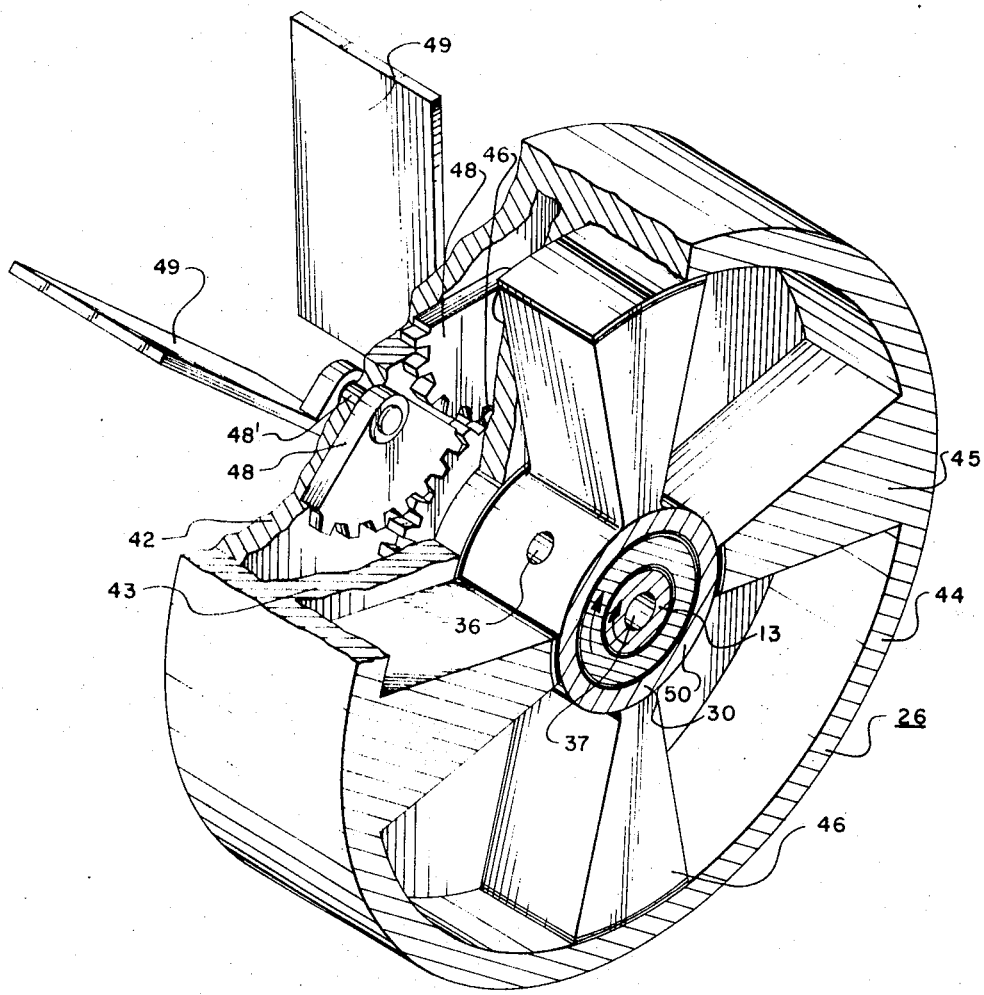
FIG. 7 is a cross-sectional perspective view of the hydraulic torque converter taken substantially along the lines 7—7 of the FIG. 3, drawn to a larger scale.

The blade control means 26 is carried within the rotor enclosure 40. Referring now to the FIGS. 5, 6 and 7, the blade control meanss 26 comprises a pair of substantially wedge-shaped blade pairs 45 and 46, a sleeved sun gear 47, blade gears 48, and blades 49. The pair of substantially wedge-shaped blades 45 are opposingly fastened at their respective widest ends to the cylindrical wall 44. The complimentary pair of wedge-shaped blades 46 are opposingly fastened at their narrow ends to a sleeve-like carrier 50, as shown more clearly by the FIG. 7. It is to be understood that the narrow end of the blades 45 and the wide end of the blades 46 ride freely against the respective opposing carrier 50 and wall 44. The carrier 50 is journaled for rotation on the shaft 30 on its portion under the enclosure 40 and is journaled for rotation in the wall 43. It is in the carrier 50 that the aforementioned exitway 36 is disposed. Between the walls 42 and 43 the sun gear 47 is fastened to the corresponding terminal end of the carrier 50. The blade gears 48 are disposed on the wall 42 in planetary gear fashion about the sun gear 47 on axis 48'. Referring to the FIGS. 4 and 5, which show both sides of the wall 42, a multiplicity of rotor blades 49 are disposed about the circumference of the wall 42. Each blade 49 is fastened to an axis 48'. The blades 49 may be rectangular plates which are disposed at right angles to the rotor wall 42, and which pivot on their respective axis means 48' at their ends closest the center of the shaft 30. Each axis 48' is journaled for rotation in the wall 42, and provides the axis of rotation for each blade gear 48 and each blade 49. In this embodiment the blade gears 48 are quarter gears.

In operation, pressure is applied between the wedge-shaped blades 45 and 46 resulting in a displacement of blades 46 with respect to blades 45 and rotation of the carrier 50. The rotation of the carrier 50 and sun gear 47 results in rotation of the blade gears 48 and the blades 49 to a maximum power transfer angle of that shown in solid lines of the FIG. 4. To retract the blades 49, pressure is reduced between the blades 45 and 46. Fluid in the chamber 28' tends to force the blades 49 to an angle of attack of less resistance and less power transfer, shown by the blade 49 in broken lines in FIG. 4. The blade gears 48 drive the carrier 50 to rotate in reverse and the blades 45 and 46 come closer together.

Figure 8:
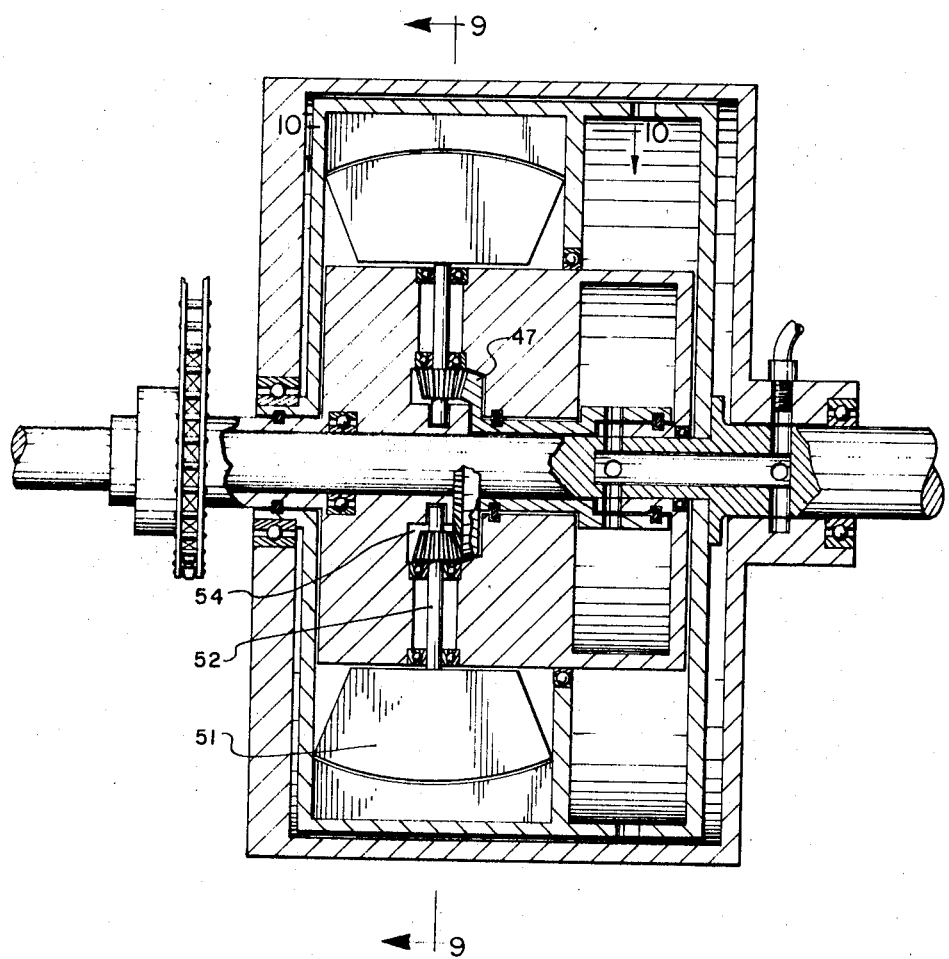
FIG. 8 is a side elevational view of a further embodiment of the hydraulic torque converter of this invention.
Figure 9:
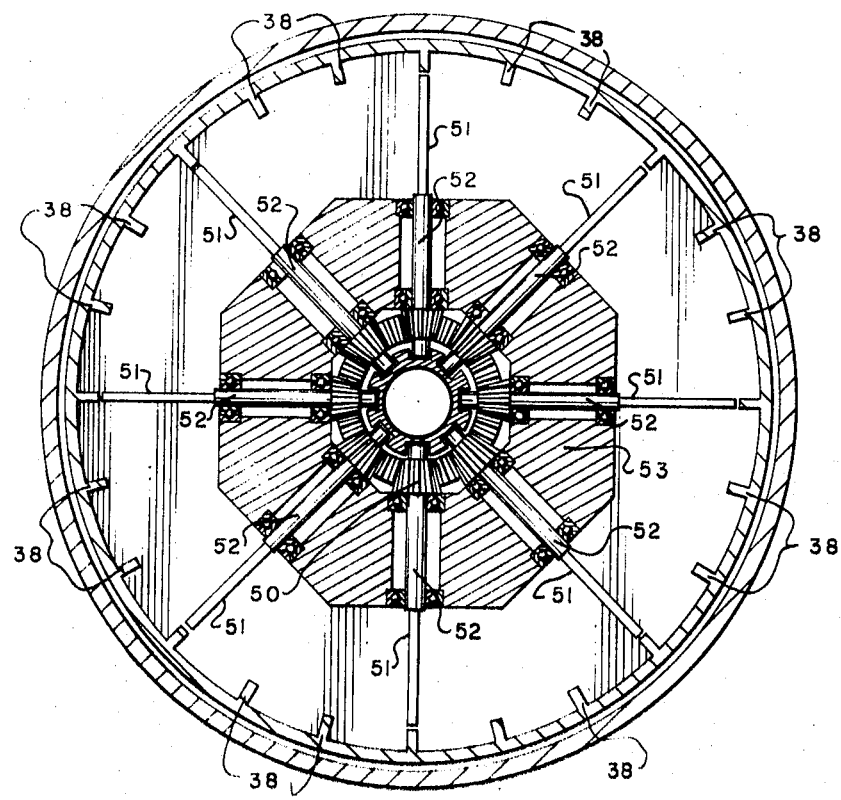
FIG. 9 is a cross-sectional view of the hydraulic torque converter taken substantially along the lines 9—9 of the FIG. 8.
Figure 10:
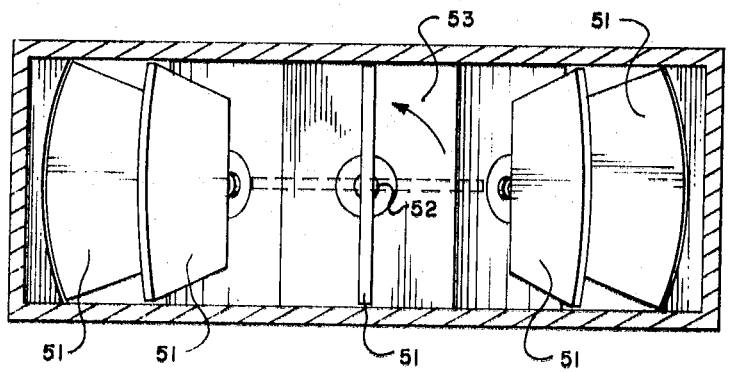
FIG. 10 is a cross-sectional perspective view of the hydraulic torque converter taken substantially along the lines 10—10 of the FIG. 8.

Referring now to the FIGS. 8, 9 and 10, a further embodiment of the rotor assembly 25 and the blade control means 26 includes a plurality of blades 51 which are substantially fan-shaped plates. Each blade pivots on a shaft 52 centrally disposed at the narrower terminal end of each blade 51. The shafts 52 are journaled for rotation in a polygonally shaped block 53 carried on the rotor shaft 30. The block 53 has a polygonal side for each of the blades 51. Each of the shafts 52 is provided with a bevel gear 54 mounted at its respective terminal end of each shaft 52 closest the shaft 13 as shown more clearly in the FIG. 9. The sun gear 47 of the further embodiment is a beveled sun gear. The fins 38 have a concave configuration on their respective inner terminal edges to conform distally to the convex outer edge of each of the blades 51.

In operation, pressure is applied as set out above and the beveled sun gear 47 rotates. The rotation of the sun gear 47 forces the bevel gears 54 to rotate, thus changing the angle of attack of the blades 51. The angle of maximum power transfer is at right angles to the drum sidewall 28 as shown by the blades 51 in solid lines in FIG. 10. The angle of attack of least power transfer is a blade parallel to the drum wall 28, shown in broken lines in FIG. 10. Referring to FIG. 8, to reduce power, pressure between the blades 45 and 46 is reduced. Fluid in the chamber 28' tends to act on the unsupported sides of the blades 51, thus rotating the blades 51 in the angle of attack of less resistance. It is to be understood that in both of the above embodiments there are an infinite number of settings available through the blade control means 26.

Referring again to the FIG. 1, the hydraulic torque converter 11 may be provided with a countergear assembly 12 to provide higher and lower output speed ranges to the converter 11. The countergear 12 comprises a countergear shaft 21, a gearset 22, and a direct drive means 14'. The countergear 21 is journaled for rotation in the aforementioned housing 16. The countergear shaft 21 is driven by the afore-mentioned means communicating power 17. The means 17 may be engaged and disengaged from the shaft 21 by a clutch 20. At one of the terminal ends of the shaft 21 is suitably disposed the gearset 22. Thus, it may be seen that the countergear assembly 12 is a torque power transmitting apparatus which may be analogous to a countergear of gear-type transmissions.

Figure 2:
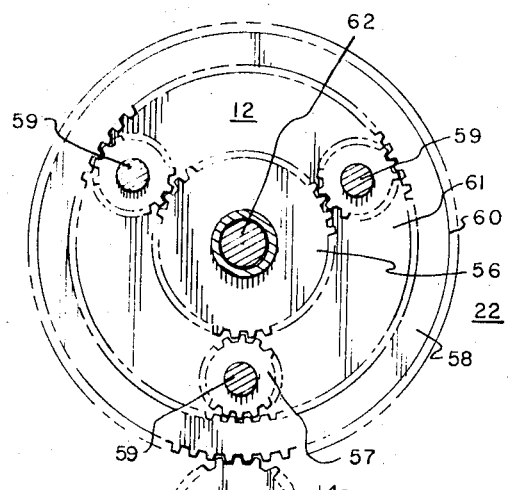
FIG. 2 is a cross-sectional view taken substantially along the lines 2—2 of the FIG. 1 showing the gearset of the countergear assembly communicating with the driven pinion gear.

The gearset 22 is intended to change the direction of rotation of the output of the variable speed transmission 10, and may be geared in ratios, which may increase or reduce output speed, as shown to advantage in the FIGS. 1 and 2. The gearset 22 is carried in a housing 55 and comprises a sun gear 56, a plurality of gears 57, and a ring gear disk 58. The sun gear 56 is fastened to the terminal end of the shaft 21. The plurality of gears 57 are disposed on journaled shafts 59 provided on one of the interior sidewalls of the housing 55. The ring gear disk 58 comprises a ring gear 60 fastened to a circular disk-like plate 61, which is in turn fastened at the disk center to a output shaft 62. The ring gear 60 is provided with suitable teeth and pitch on its inner circle to engage the gears 57. The countergear shaft 21 drives the sun gear 56, which drives the gears 57 in an opposite direction of rotation, which drives the ring gear disk 58 and the output shaft 62 in the same direction as the gears 57.

The direct drive 14' is operable to transmit power directly from the power source to the gearset 22. The direct drive 14' comprises the aforementioned shaft 13, pinion 14 fastened to the terminal end of the shaft 13 and a clutch 15 disposed between the pinion 14 and the torque converter 11. The pinion 14 engages teeth on the outer edge of the ring gear disk 58. The ring gear disk 58 projects through the terminal edge of the housing 55 through an opening suitable to permit the ring gear disk 58 to engage the pinion 14. It may be seen that the structure of the gearset 22 may be analogized with a planetary gearset and a differential gearset in that there are two power input shafts 13 and 21 and a single output shaft 30, although the shafts 13 and 21 are alternately engaged, and in that the gears 57 are disposed about the sun gear 56 and within the ring gear disk 58 in a manner analogous to a planetary gearset.

In operation the countergear assembly 12 is engageable with the shaft 21 to drive the gearset 22 by disengaging clutch 20 and engaging the clutch 15 thus disengaging the pinion 14. Alternately, the direct drive 19 may drive the ring gear disk 60 by disengaging the clutch 15, thus driving the pinion 14 on the shaft 13, and engaging the clutch 20 and disengaging the shaft 19 from driving the gearset 22.

Having thus described in detail a preferred apparatus which embodies the concepts and principles of the invention and which accomplishes the various objects, purposes and aims thereof, it is to be appreciated and will be apparent to those skilled in the art that many physical changes could be made in the apparatus without altering the inventive concepts and principles embodied therein. Hence, it is intended that the scope of the invention be limited only to the extent indicated in the appended claims.

I claim:

1. A variable speed transmission comprising: a drum assembly, connected to an input shaft from a suitable torque power source, having a cylindrical chamber carrying fluid, said chamber having fins at intervals on its inner cylindrical wall; a rotor connected to an output shaft, carried in said drum assembly, having a plate perpendicularly disposed to said rotor output shaft, and having a plurality of selectively movable blades disposed at intervals distally from the circumference of said rotor plate; blade control means carried in a cylindrical enclosure on said rotor and including a pair of opposing wedge-shaped members having their widest ends fixedly dependently mounted to the interior terminal side of the cylindrical wall of said enclosure, a pair of opposing wedge-shaped members having their narrowest ends dependently mounted to a sleeve-like carrier, said sleeve-like carrier having a sun gear at one of its terminal ends to engage with a plurality of suitable quarter gears connected to said blades; and a suitable pressure means for selectively forcing said pairs of wedge-shaped members apart and to selectively actuate said sun gear of said sleeve-like carrier.

2. The apparatus of Claim 1, including a countergear assembly, comprising: a countergear drive shaft connected to said output shaft of said rotor; a gearset comprising a sun gear disposed at one of the terminal ends of said countergear drive shaft, a plurality of suitably disposed gears each engageable with said sun gear, and a ring gear having suitably configured teeth on its inner wall operable to engage said gears, and suitably configured teeth on the outer terminal wall of said ring gear, said ring gear being fixedly fastened to a disk connected to a countergear output shaft; a direct drive pinion fastened to the terminal end of said input drive shaft operable to engage said outer gear teeth of said ring gear; and clutch means on said countergear drive shaft and on said pinion portion of said input drive shaft to selectively alternately engage said countergear or said pinion.

3. The apparatus of Claim 1, wherein said blades comprise rectangular plates pivotally mounted at one of their terminal ends to the shaft of each of said quarter gears.

4. The apparatus of Claim 1, wherein said blades are suitably carried on a suitably configured polygonal rotor, said blades mounted on shafts having at their end opposite said blades suitably configured bevel gears engageable with a bevel sun gear.

* * * * *